H. H. JOHNSON.
BREAD SLICING MACHINE.
APPLICATION FILED SEPT. 10, 1915.

1,179,836.

Patented Apr. 18, 1916.
4 SHEETS—SHEET 1.

Inventor,
H. H. Johnson.
By Victor J. Evans,
Attorney

H. H. JOHNSON.
BREAD SLICING MACHINE.
APPLICATION FILED SEPT. 10, 1915.

1,179,836.

Patented Apr. 18, 1916.
4 SHEETS—SHEET 2.

Witnesses:

Inventor,
H. H. Johnson.
By Victor J. Evans,
Attorney.

H. H. JOHNSON.
BREAD SLICING MACHINE.
APPLICATION FILED SEPT. 10, 1915.

1,179,836.

Patented Apr. 18, 1916.
4 SHEETS—SHEET 3.

Witnesses:
C. Peinle, Jr.
[signature]

Inventor,
H. H. Johnson.
By Victor J. Evans,
Attorney.

THE COLUMBIA PLANOGRAPH CO., WASHINGTON, D. C.

H. H. JOHNSON.
BREAD SLICING MACHINE.
APPLICATION FILED SEPT. 10, 1915.

1,179,836.

Patented Apr. 18, 1916.
4 SHEETS—SHEET 4.

Witnesses:

Inventor,
H. H. Johnson.
By Victor J. Evans,
Attorney.

UNITED STATES PATENT OFFICE.

HENRY H. JOHNSON, OF AKRON, OHIO.

BREAD-SLICING MACHINE.

1,179,836.  Specification of Letters Patent.  Patented Apr. 18, 1916.

Application filed September 10, 1915.  Serial No. 50,033.

*To all whom it may concern:*

Be it known that I, HENRY H. JOHNSON, a citizen of the United States, residing at Akron, in the county of Summit and State of Ohio, have invented new and useful Improvements in Bread-Slicing Machines, of which the following is a specification.

The invention relates to a slicing machine, and more particularly to the class of bread slicing machines.

The primary object of the invention is the provision of a machine of this character wherein a number of loaves of bread can be placed therein so that the loaves will be successively fed into the path of the knife for the slicing of the same either in thin or thick slices as the occasion may require.

Another object of the invention is the provision of a machine of this character wherein the slices are uniformly cut so that they will be of a like size relative to each other.

A further object of the invention is the provision of a machine of this character wherein the loaves of bread are fed to the knife in a novel manner, which is reciprocated for angular cutting action so that the bread can be sliced automatically and the knife operated in a convenient manner.

A still further object of the invention is the provision of a machine of this character which is simple in construction, thoroughly reliable and efficient in its operation, positively feeding the bread loaves into position to be sliced, and also one which is inexpensive in manufacture.

With these and other objects in view, the invention consists in the construction, combination and arrangement of parts as will be hereinafter fully described, illustrated in the accompanying drawings, and pointed out in the claims hereunto appended.

Figure 1:
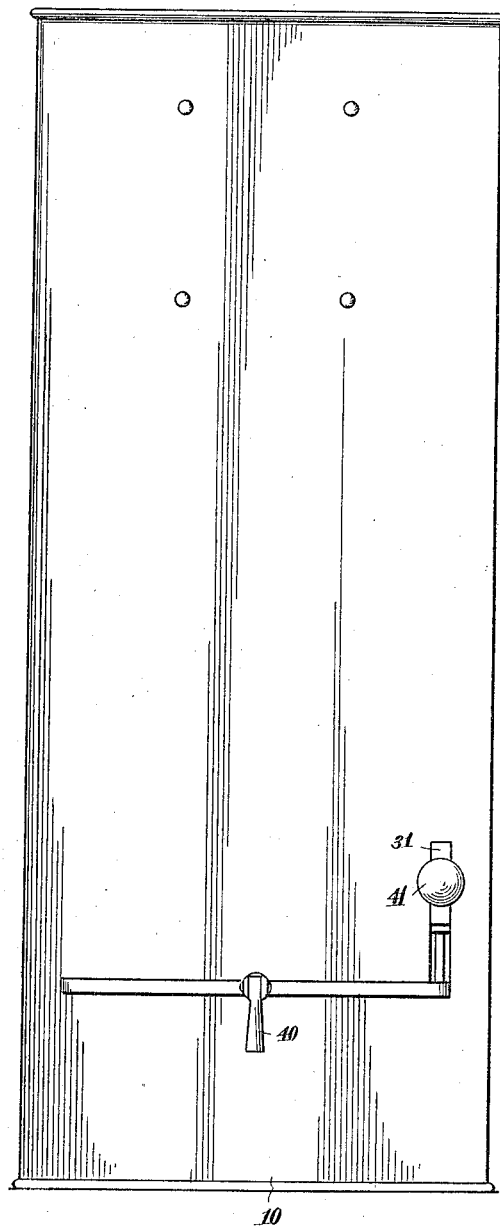
Figure 2:
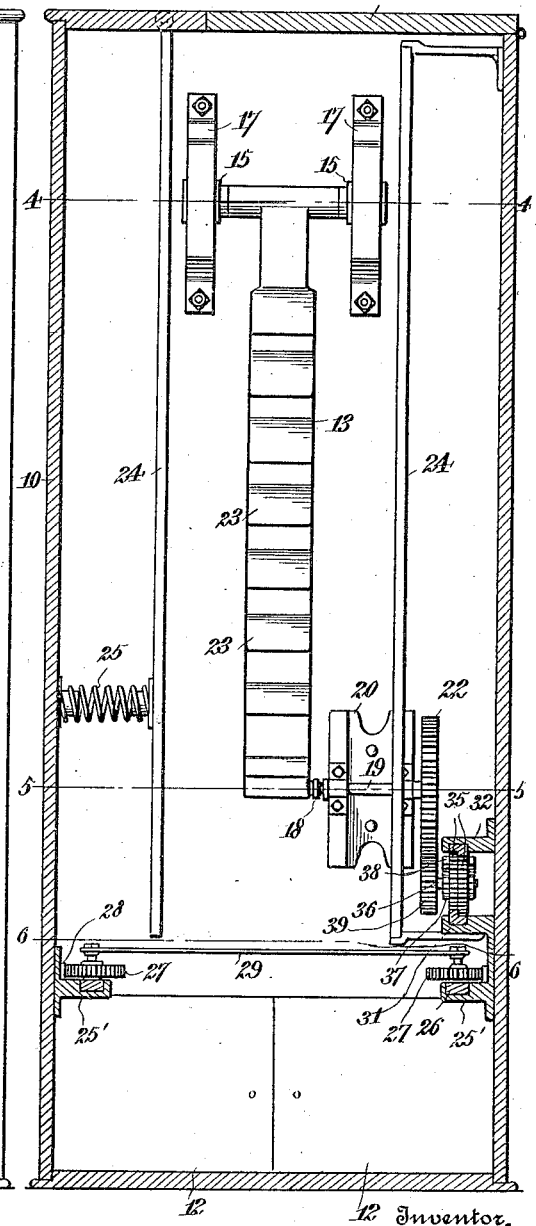
Figure 3:
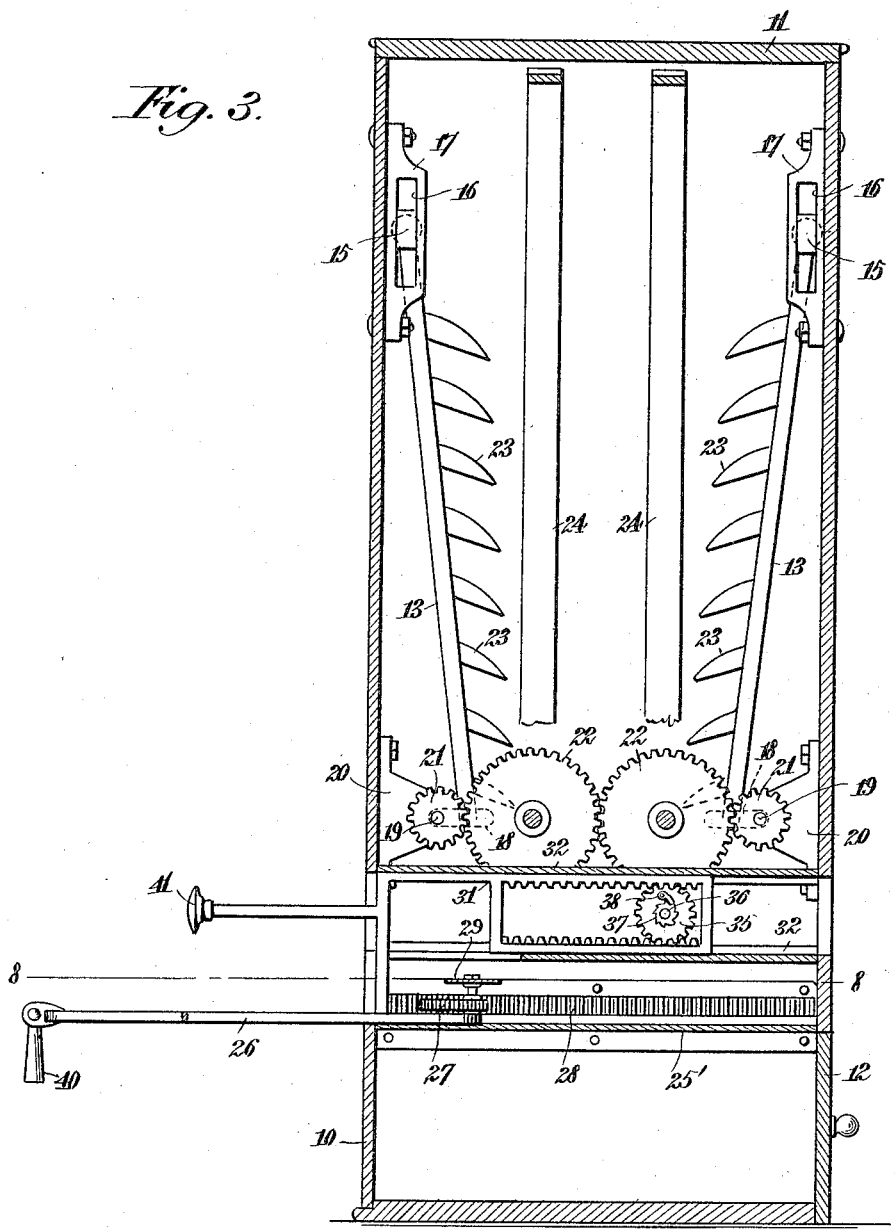
Figure 4:
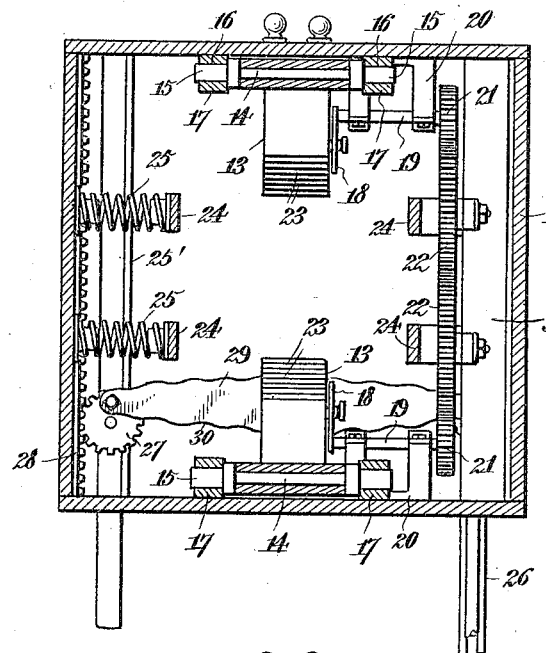
Figure 5:
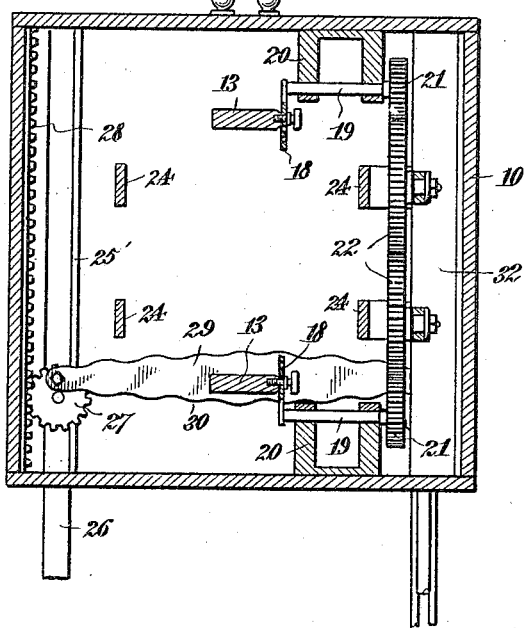
Figure 6:
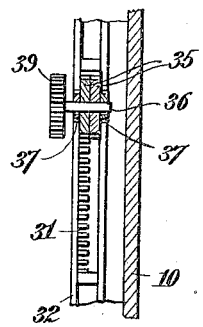
Figure 7:
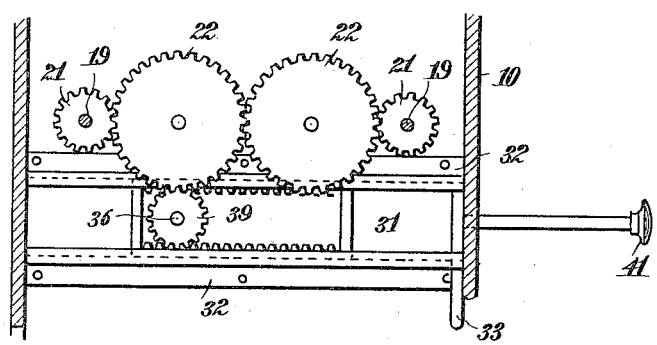
Figure 8:
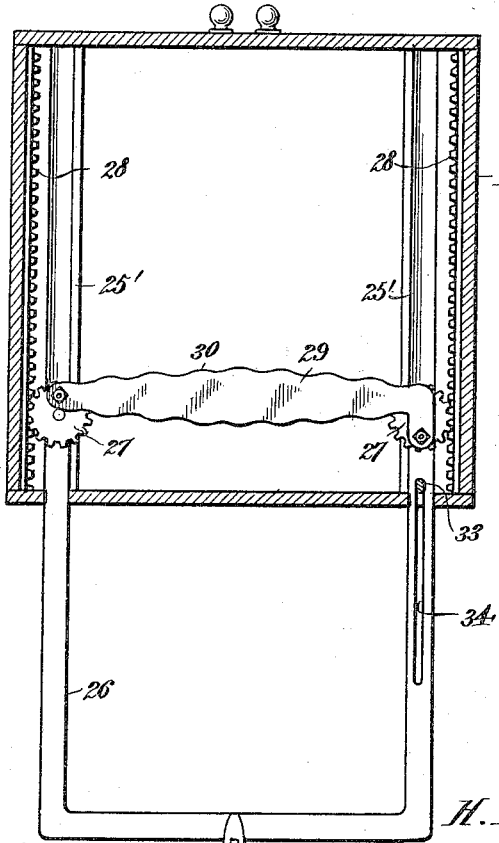

In the drawing:—Figure 1 is a front elevation of a machine constructed in accordance with the invention. Fig. 2 is a vertical longitudinal sectional view thereof. Fig. 3 is a vertical transverse sectional view. Fig. 4 is a sectional view on the line 4—4 of Fig. 2. Fig. 5 is a sectional view on the line 5—5 of Fig. 2. Fig. 6 is a sectional view on the line 6—6 of Fig. 2. Fig. 7 is a fragmentary vertical longitudinal sectional view showing in detail the driven gears of the feed mechanism for the bread loaves. Fig. 8 is a sectional view on the line 8—8 of Fig. 3.

Similar reference characters indicate corresponding parts throughout the several views in the drawings.

Referring to the drawings in detail, the bread slicing machine comprises a casing 10, preferably made from wood, although the same may be made from any other suitable material, and is provided with upper and lower front doors 11 and 12, respectively, so that access may be had to the interior thereof, and in the upper portion of the casing 10 is arranged the loaf bread feeding mechanism hereinafter fully described.

The loaf bread feeding mechanism comprises a pair of oppositely disposed movable toothed bars 13 having fixed to their upper ends cross head pins 14, each being journaled in slide blocks 15 mounted for sliding movement in guideways 16 formed in stationary guide blocks 17 secured to opposite side walls of the casing 10 near the top thereof, while the lower ends of the said bars 13 are loosely connected to adjustable throw arms 18 fixed to counter shafts 19 journaled in bearings 20 secured to the opposite vertical walls of the casing 10, and upon these counter shafts are fixed pinions 21 meshing with driven gears 22 suitably journaled interiorly of the casing, and are in mesh with each other so that the toothed bars 13 will, when actuated, move toward and away from each other and also move in a direction longitudinally of the casing so that a loaf of bread placed between the said bars will be gripped by the teeth 23 thereon and fed toward the bottom of the casing into the path of slicing mechanism hereinafter fully described.

Within the casing 10 and suitably hinged or swingingly connected to the side walls thereof at right angles to the walls supporting the feed bars 13 are opposed holding strips 24 which near their lower free ends are acted upon by means of tension springs 25 suitably mounted upon the casing 10 against displacement, and these boards 24 hold the loaf bread when released by the feed bars 13 so as to prevent the falling of the loaf bread, and in this manner the same is firmly held so that it will be fed in a step by step manner into the path of the slicing mechanism. Any reasonable number of loaves of bread can be placed within the casing 10 for the successive feeding thereof to the slicing mechanism. The throw arms 18 are adjustable to vary the extent of feed of each loaf of bread to the slicing mechanism so that different sizes of slices can be cut from the loaf.

Located below the feeding mechanism within the casing 10 are oppositely disposed horizontally arranged guide tracks 25' in which are slidably fitted the side limbs of a knife frame 26, and upon the limbs of this frame are journaled cog gears 27, each of which meshes with a cog rail or rack 28 which is secured to the sides of the casing above the tracks 25, while eccentrically pivoted to the cog gears 27 are the ends of a knife blade 29 having corrugated front and rear cutting edges 30 which are adapted on reciprocation of the frame 26 to slice the loaf bread when fed into the path of the blade 29 by the feed mechanism hereinbefore set forth.

Above the knife frame 26 and interiorly of the casing at one side thereof is a toothed double rack slide 31 which is movably mounted in suitable guide cleats 32 and is pronged at its forward end with a depending pin or lug 33 which engages in a slot 34 formed in one side limb of the knife frame 26, while meshing with the racks of the said slides are the two pinions 35 loose upon the shaft 36 which carry reverse ratchets 37 for engagement with the pawls 38 on the pinions 35, so that on movement of the slide 31 the racks meshing with the reverse pinions will effect a continuous motion of the shaft 36, which also has fixed thereto a gear 39 meshing with one of the gears 22 for the driving thereof.

It will be apparent that by moving the knife frame 26 inwardly the knife 29 will be reciprocated in a course for the slicing of loaf bread, and when the frame 26 has moved a predetermined distance it will actuate the slide 31, which in its turn imparts rotation to the shaft 36, and by the gear connection thereof with the feed mechanism the feed bars 13 will be actuated for the feeding of the loaves of bread into the path of the knife 29, the loaves of bread being fed in a step by step manner when the knife frame 26 is pushed inwardly within the casing 10 and pulled outwardly therefrom, the knife 29 cutting the slices on both strokes of the frame 26 supporting the same, the said frame 26 being provided with a pivoted handle 40 at its front end so that it can be manually actuated.

The slices of bread gravitate or drop within the lower portion of the casing 10, and on the opening of the lower doors 12 the said slices can be extracted or removed from the casing. When the feed mechanism for the loaf bread is adjusted the loaves will be fed into the path of the knife 29 so that various sizes of thickness of the slices of bread can be had as the occasion may require.

At the forward end of the slide 31 is a handle 41 so that the said slide can be moved by hand for manually actuating the feed bars 13 if desired.

What is claimed is:—

1. A bread slicing machine comprising a casing, eccentrically and slidably movable feed bars arranged within the casing and having teeth for gripping loaf bread, a knife frame slidably fitted in the casing, racks fixed in the casing, cog wheels on the knife frame and meshing with the racks, a knife blade eccentrically pivoted to the cog wheels and having double knife edges, driven gear mechanism for operating the feed bars simultaneously with each other, and means acted upon by the knife frame for driving the gear mechanism at predetermined intervals.

2. A bread slicing machine comprising a casing, eccentrically and slidably movable feed bars arranged within the casing and having teeth for gripping loaf bread, a knife frame slidably fitted in the casing, racks fixed in the casing, cog wheels on the knife frame and meshing with the racks, a knife blade eccentrically pivoted to the cog wheels and having double knife edges, driven gear mechanism for operating the feed bars simultaneously with each other, means acted upon by the knife frame for driving the gear mechanism at predetermined intervals, and means for holding loaf bread for action by the feed bars.

3. A bread slicing machine comprising a casing, eccentrically and slidably movable feed bars arranged within the casing and having teeth for gripping loaf bread, a knife frame slidably fitted in the casing, racks fixed in the casing, cog wheels on the knife frame and meshing with the racks, a knife blade eccentrically pivoted to the cog wheels and having double knife edges, driven gear mechanism for operating the feed bars simultaneously with each other, means acted upon by the knife frame for driving the gear mechanism at predetermined intervals, means for holding loaf bread for action by the feed bars, and means for varying the eccentric movement of the feed bars.

4. A bread slicing machine comprising a casing, eccentrically and slidably movable feed bars arranged within the casing and having teeth for gripping loaf bread, a knife frame slidably fitted in the casing, racks fixed in the casing, cog wheels on the knife frame and meshing with the racks, a knife blade eccentrically pivoted to the cog wheels and having double knife edges, driven gear mechanism for operating the feed bars simultaneously with each other, means acted upon by the knife frame for driving the gear mechanism at predetermined intervals, means for holding loaf bread for action by the feed bars, means for varying the eccentric movement of the feed bars, and means for tensioning the loaf bread holding means.

In testimony whereof I affix my signature in presence of two witnesses.

HENRY H. JOHNSON.

Witnesses:
L. S. PARDEE,
DAISY E. VEST.

Copies of this patent may be obtained for five cents each, by addressing the "Commissioner of Patents, Washington, D. C."